United States Patent
Park et al.

(10) Patent No.: US 11,206,592 B2
(45) Date of Patent: Dec. 21, 2021

(54) METHOD OF TRANSMITTING LOW-LATENCY DATA DURING HANDOVER IN COMMUNICATION SYSTEM, AND APPARATUS THEREFOR

(71) Applicant: ELECTRONICS AND TELECOMMUNICATIONS RESEARCH INSTITUTE, Daejeon (KR)

(72) Inventors: Hyun Seo Park, Daejeon (KR); Yun Joo Kim, Seongnam-si (KR); Eunkyung Kim, Daejeon (KR); Tae Joong Kim, Daejeon (KR); An Seok Lee, Daejeon (KR); Yu Ro Lee, Daejeon (KR); Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/848,383

(22) Filed: Apr. 14, 2020

(65) Prior Publication Data
US 2020/0336960 A1   Oct. 22, 2020

(30) Foreign Application Priority Data

Apr. 18, 2019  (KR) .......................... 10-2019-0045736
Mar. 26, 2020  (KR) .......................... 10-2020-0036695

(51) Int. Cl.
*H04W 36/08*   (2009.01)
*H04W 76/12*   (2018.01)
(Continued)

(52) U.S. Cl.
CPC ........... *H04W 36/08* (2013.01); *H04L 1/1642* (2013.01); *H04W 8/08* (2013.01); *H04W 48/16* (2013.01); *H04W 76/12* (2018.02); *H04W 80/10* (2013.01)

(58) Field of Classification Search
CPC . H04W 80/02; H04W 36/08; H04W 36/0069; H04W 76/15; H04W 36/0072;
(Continued)

(56) References Cited

U.S. PATENT DOCUMENTS

2008/0310367 A1   12/2008  Meylan
2010/0067483 A1*   3/2010  Ahluwalia .......... H04W 36/023
                                                              370/331
(Continued)

FOREIGN PATENT DOCUMENTS

WO   2007/007990 A1    1/2007
WO   2016/159441 A1   10/2016

OTHER PUBLICATIONS

3GPP TSG SA WG2, Meeting #128bis, S2-187843, Aug. 14, 2018. "Updating for solution#5 in FS_URLLC", OPPO.
(Continued)

*Primary Examiner* — Daniel Lai
(74) *Attorney, Agent, or Firm* — Rabin & Berdo, P.C.

(57) ABSTRACT

An operation method of a terminal performing handover in a mobile communication system may comprise transmitting packet data convergence protocol (PDCP) downlink reception status information of the terminal and information on a target base station to a source base station; receiving downlink data from a user plane function (UPF) via the source base station based on a first tunnel configured between the source base station and the UPF; receiving downlink data from the UPF via the target base station based on a second tunnel configured by the UPF between the target base station
(Continued)

and the UPF by using the PDCP downlink reception status information and the information on the target base station, which are transferred from the source base station; and discarding duplicated-received protocol data units (PDUs) from the source base station and the target base station, and reordering remaining PDUs.

19 Claims, 7 Drawing Sheets

(51) Int. Cl.
  *H04L 1/16* (2006.01)
  *H04W 8/08* (2009.01)
  *H04W 48/16* (2009.01)
  *H04W 80/10* (2009.01)

(58) Field of Classification Search
  CPC . H04W 36/18; H04W 36/0055; H04W 28/06; H04W 36/0058; H04W 36/0061; H04W 36/0083; H04W 72/02; H04W 76/20; H04W 76/30; H04W 36/00; H04W 36/0005; H04W 36/0085; H04W 36/06; H04W 36/36; H04W 56/001; H04W 76/12; H04W 24/02; H04W 36/0016; H04W 36/0033; H04W 36/00835; H04W 36/02; H04W 36/023; H04W 36/22; H04W 76/16; H04W 76/22; H04W 36/0011; H04W 36/00837; H04W 36/0094; H04W 40/24; H04W 76/10; H04W 76/34; H04W 8/08; H04W 48/16; H04W 80/10; H04L 1/1874; H04L 1/1896; H04L 1/18; H04L 1/1835; H04L 1/1819; H04L 1/1822; H04L 1/1825; H04L 1/1829; H04L 1/1864; H04L 1/1867; H04L 1/189; H04L 1/1893; H04L 1/1642

See application file for complete search history.

(56) References Cited

U.S. PATENT DOCUMENTS

| | | |
|---|---|---|
| 2010/0189076 A1 | 7/2010 | Kim |
| 2011/0117916 A1* | 5/2011 | Dahlen ................ H04W 36/30 455/436 |
| 2011/0149905 A1 | 6/2011 | Kim |
| 2012/0039300 A1 | 2/2012 | Blume |
| 2012/0224525 A1* | 9/2012 | Wang .................... H04W 80/02 370/315 |
| 2017/0078914 A1* | 3/2017 | Fujishiro ............... H04W 88/06 |
| 2017/0251405 A1 | 8/2017 | Stojanovski et al. |
| 2019/0059067 A1 | 2/2019 | Lee et al. |
| 2019/0268815 A1* | 8/2019 | Zhu ....................... H04W 80/08 |
| 2021/0266811 A1* | 8/2021 | Hwang ................ H04W 24/10 |

OTHER PUBLICATIONS

3GPP TSG SA WG3, Meeting #94Ad-Hoc,S3-190620,Mar. 4, 2019. "Enhancement of handover with Xn forwarding tunnel", ZTE Corporation.

* cited by examiner

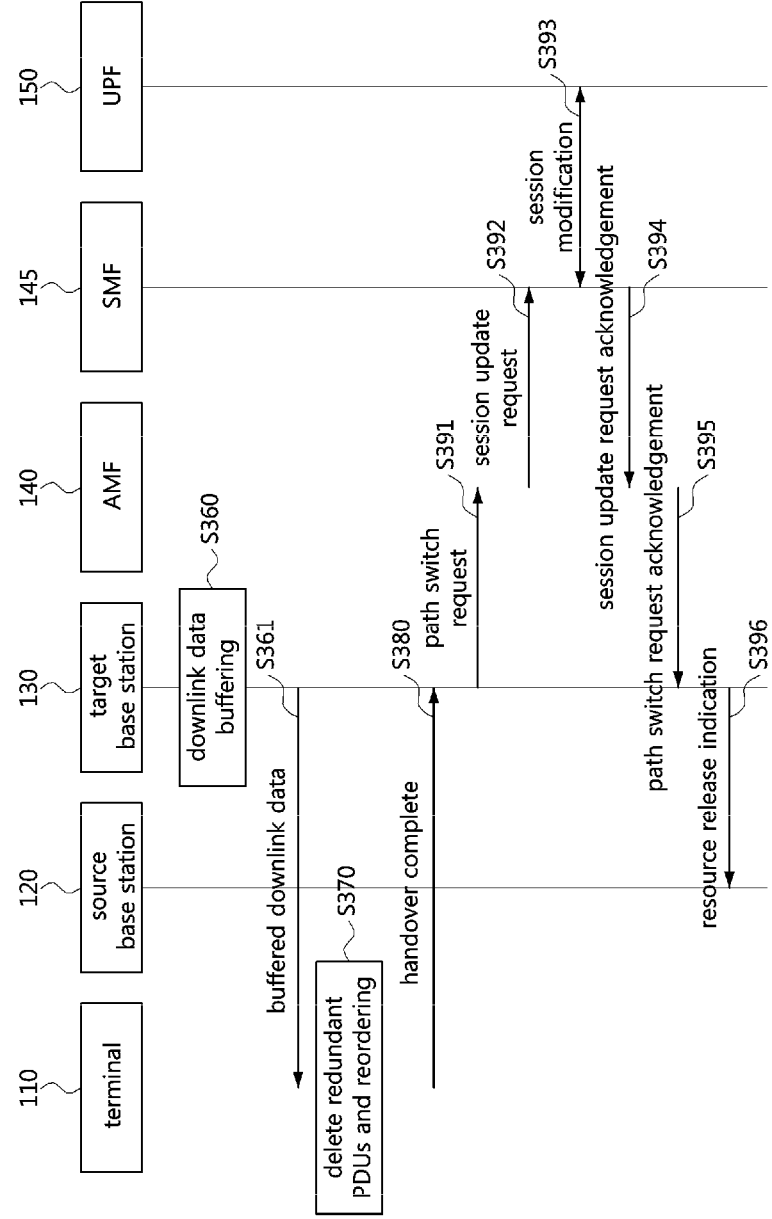

| Octets | Bits 8 | 7 | 6 | 5 | 4 | 3 | 2 | 1 |
|---|---|---|---|---|---|---|---|---|
| 1 | Version | | | PT | | E | S | PN |
| 2 | Message Type ||||||||
| 3 | Length (1st Octet) ||||||||
| 4 | Length (2nd Octet) ||||||||
| 5 | Tunnel Endpoint Identifier (1st Octet) ||||||||
| 6 | Tunnel Endpoint Identifier (2nd Octet) ||||||||
| 7 | Tunnel Endpoint Identifier (3rd Octet) ||||||||
| 8 | Tunnel Endpoint Identifier (4th Octet) ||||||||
| 9 | Sequence Number (1st Octet) ||||||||
| 10 | Sequence Number (2nd Octet) ||||||||
| 11 | N-PDU Number ||||||||
| 12 | Next Extension Header Type ||||||||

METHOD OF TRANSMITTING LOW-LATENCY DATA DURING HANDOVER IN COMMUNICATION SYSTEM, AND APPARATUS THEREFOR

CROSS-REFERENCE TO RELATED APPLICATIONS

This application claims priority to Korean Patent Applications No. 10-2019-0045736 filed on Apr. 18, 2019, and No. 10-2020-0036695 filed on Mar. 26, 2020 with the Korean Intellectual Property Office (KIPO), the entire contents of which are hereby incorporated by reference.

BACKGROUND

1. Technical Field

The present disclosure relates generally to handover technologies of a mobile communication system, and more specifically, to a method for transmitting low-latency data during handover, and an apparatus for the same.

2. Related Art

When a handover occurs due to movement of a terminal in the conventional mobile communication system (e.g., long term evolution (LTE) or new radio (NR) system), a source base station configures a data forwarding tunnel to a target base station. The source base station forwards downlink data to be transmitted to the terminal to the target base station through the configured forwarding tunnel, and when the terminal completes the handover, the target base station transmits the corresponding data to the terminal. In addition, the source base station forwards out-of-sequence data among uplink data received from the terminal to the target base station through the configured forwarding tunnel, and when the terminal completes the handover, the target base station receives the uplink data from the terminal, and transfers the uplink data to a core network (CN) in a correct order.

That is, in the handover procedure, the source base station and the target base station mutually forward data related to the handover target terminal using an interface between the base stations (i.e., inter-base station interface). However, a non-ideal backhaul having a transmission delay time that is not negligibly small is usually assumed as the inter-base station interface. Accordingly, when data is forwarded through the forwarding tunnel configured based on the inter-base station interface, a latency or jitter may become so large that it cannot be ignored, and thus a problem may occur that ultra-reliability and low-latency (URLLC) requirements cannot be satisfied due to this delay or jitter.

SUMMARY

Accordingly, exemplary embodiments of the present disclosure provide an operation method of a terminal for transmitting low-latency data during handover in a mobile communication system.

Accordingly, exemplary embodiments of the present disclosure provide an operation method of a base station for transmitting low-latency data during handover in a mobile communication system.

According to an exemplary embodiment of the present disclosure, an operation method of a terminal performing handover in a mobile communication system may comprise transmitting packet data convergence protocol (PDCP) downlink reception status information of the terminal and information on a target base station to a source base station; receiving downlink data from a user plane function (UPF) via the source base station based on a first tunnel configured between the source base station and the UPF; receiving downlink data from the UPF via the target base station based on a second tunnel configured by the UPF between the target base station and the UPF by using the PDCP downlink reception status information and the information on the target base station, which are transferred from the source base station; and discarding duplicated-received protocol data units (PDUs) from the source base station and the target base station, and reordering remaining PDUs.

The PDCP downlink reception status information may be sequence number (SN) information of downlink PDCP PDUs received by the terminal from the source base station or information indicating downlink PDCP PDUs requiring to be retransmitted.

The PDCP uplink reception status information of the source base station may be transferred by the source base station to the UPF, and the PDCP uplink reception status information may be information indicating SN information of uplink PDCP PDUs received by the source base station from the terminal or information indicating uplink PDCP PDUs requiring to be retransmitted.

Each of the first tunnel and the second tunnel may be a GPRS tunneling protocol (GTP) tunnel.

Mapping information between PDCP SN information among the terminal, the source base station, and the target base station, and GTP SN information among the source base station, the target base station, and the UPF may be managed by the source base station, and the source base station and the target base station may perform mapping between SNs of GTP packets exchanged with the UPF and SNs of PDCP PDUs exchanged with the terminal by using the mapping information.

The operation method may further comprise transmitting a handover complete message to the target base station, wherein the UPF releases the first tunnel according to a path switch request of the target base station.

According to another exemplary embodiment of the present disclosure, an operation method of a source base station supporting handover of a terminal may comprise receiving packet data convergence protocol (PDCP) downlink reception status information of the terminal and information on a target base station from the terminal; transmitting the PDCP downlink reception status information and the information on the target base station to a user plane function (UPF); receiving downlink data from the UPF based on a first tunnel configured between the source base station and the UPF; and transmitting the received downlink data to the terminal, wherein the target base station receives downlink data from the UPF based on a second tunnel configured by the UPF between the target base station and the UPF by using the PDCP downlink reception status information and the information on the target base station, stores the downlink data in a buffer, and transmit the downlink data stored in the buffer to the terminal, and the terminal discards duplicated-received protocol data units (PDUs) from the source base station and the target base station, and reorders remaining PDUs.

The operation method may further comprise transferring the PDCP downlink reception status information and the information on the target base station to an access and mobility management function (AMF), wherein the AMF transfers the PDCP downlink reception status information and the information on the target base station to the UPF via a session management function (SMF).

The operation method may further comprise transferring the PDCP downlink reception status information and the information on the target base station to a session management function (SMF), wherein the SMF transfers the PDCP downlink reception status information and the information on the target base station to the UPF.

The operation method may further comprise directly transferring the PDCP downlink reception status information and the information on the target base station to the UPF.

The PDCP downlink reception status information may be sequence number (SN) information of downlink PDCP PDUs received by the terminal from the source base station or information indicating downlink PDCP PDUs requiring to be retransmitted.

The operation method may further comprise transferring PDCP uplink reception status information of the source base station to the UPF, wherein the PDCP uplink reception status information may be information indicating SN information of uplink PDCP PDUs received by the source base station from the terminal or information indicating uplink PDCP PDUs requiring to be retransmitted.

Each of the first tunnel and the second tunnel may be a GPRS tunneling protocol (GTP) tunnel.

Mapping information between PDCP SN information among the terminal, the source base station, and the target base station, and GTP SN information among the source base station, the target base station, and the UPF may be managed by the source base station, and the source base station may perform mapping between SNs of GTP packets exchanged with the UPF and SNs of PDCP PDUs exchanged with the terminal by using the mapping information.

According to yet another exemplary embodiment of the present disclosure, an operation method of a target base station supporting handover of a terminal may comprise configuring a second tunnel with a user plane function (UPF) based on packet data convergence protocol (PDCP) downlink reception status information of the terminal and information on the target base station, which are transferred from the source base station to the UPF; receiving downlink data from the UPF based on the second tunnel, and storing the downlink data in a buffer; transmitting the downlink data stored in the buffer to the terminal; and transmitting a path switch request to an access and mobility management function (AMF) when receiving a handover complete message from the terminal, and instructing the source base station to release resources for the terminal when an acknowledgement message for the path switch request is received from the AMF, wherein the source base station receives downlink data from the UPF based on a first tunnel configured between the UPF and the source base station and transmits the downlink data to the terminal, and the terminal discards duplicated-received protocol data units (PDUs) from the source base station and the target base station, and reorders remaining PDUs.

The PDCP downlink reception status information and the information on the target base station may be transferred from the source base station to the UPF via the AMF and a session management function (SMF).

The PDCP downlink reception status information and the information on the target base station may be transferred from the source base station to the UPF via a session management function (SMF).

The PDCP downlink reception status information may be sequence number (SN) information of downlink PDCP PDUs received by the terminal from the source base station or information indicating downlink PDCP PDUs requiring to be retransmitted.

Each of the first tunnel and the second tunnel may be a GPRS tunneling protocol (GTP) tunnel.

Mapping information between PDCP SN information among the terminal, the source base station, and the target base station, and GTP SN information among the source base station, the target base station, and the UPF may be managed by the target base station, and the target base station may perform mapping between SNs of GTP packets exchanged with the UPF and SNs of PDCP PDUs exchanged with the terminal by using the mapping information.

According to the exemplary embodiments of the present disclosure, instead of forwarding data from the source base station to the target base station through a tunnel configured based on the inter-base station interface, the core network can directly forward the downlink data to be transmitted to the terminal through the tunnel configured to the target base station. Therefore, when the terminal completes the handover, the target base station can transmit the corresponding data to the terminal, and the terminal can remove redundancy of the received data, and perform reordering on the data with the redundancy removed.

Similarly, the source base station forwards uplink data received from the terminal to the core network through the tunnel configured for the source base station, and the target base station can transmit the uplink data received from the terminal to the core network through the tunnel configured for the target base station. Therefore, when the terminal completes the handover, the core network can remove redundancy of the received data, and perform reordering on the data with the redundancy removed.

Through this, data transmission having minimal delay or jitter can be made possible during handover, and a communication service that satisfies the requirements of Ultra-reliability and Low-latency communication (URLLC) service can be provided.

BRIEF DESCRIPTION OF DRAWINGS

Exemplary embodiments of the present disclosure will become more apparent by describing in detail embodiments of the present disclosure with reference to the accompanying drawings, in which:

FIGS. 3A and 3B are sequence charts for describing a handover method according to an exemplary embodiment of the present disclosure;

Figure 1A:
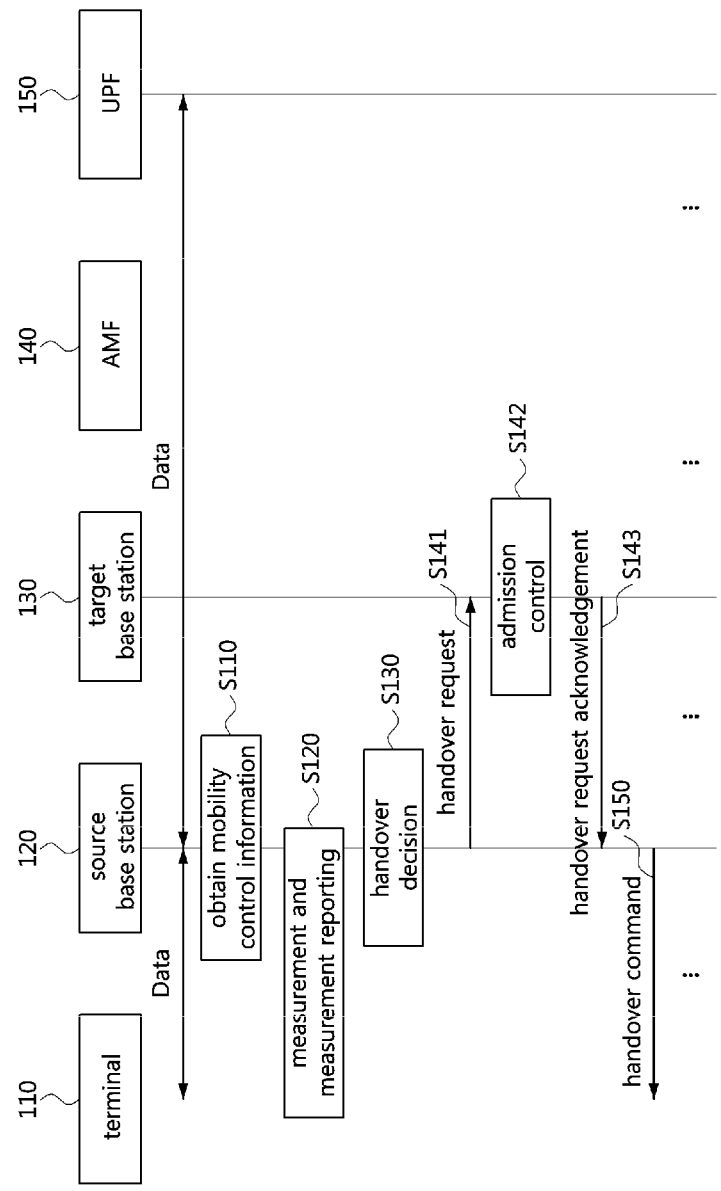
FIGS. 1A and 1B are sequence charts for describing a conventional handover procedure in a mobile communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present disclosure will be described in greater detail with reference to the accompanying drawings. To facilitate overall understanding of the present disclosure, like numbers refer to like elements throughout the description of the drawings, and description of the same component will not be reiterated.

Hereinafter, exemplary embodiments according to the present disclosure will be described on the assumption that they are applied to the 3GPP LTE or NR mobile communication system for convenience of description. However, the exemplary embodiments according to the present disclosure may be applied to other mobile communication systems, including the 3GPP LTE or NR mobile communication system.

In addition, hereinafter, the exemplary embodiments according to the present disclosure are mainly described as a method of operating a terminal performing handover. However, even when a method (e.g., transmission or reception of a signal) to be performed in a terminal is described, a corresponding base station node may perform a method (e.g., reception or transmission of the signal) corresponding to the method performed in the terminal. That is, when an operation of the terminal is described, the corresponding base station may perform an operation corresponding to the operation of the terminal. Conversely, when an operation of the base station is described, the corresponding terminal may perform an operation corresponding to the operation of the base station. Therefore, it should be understood that the exemplary embodiments according to the present disclosure are applicable not only to the terminal but also to the base station.

Figure 1B:
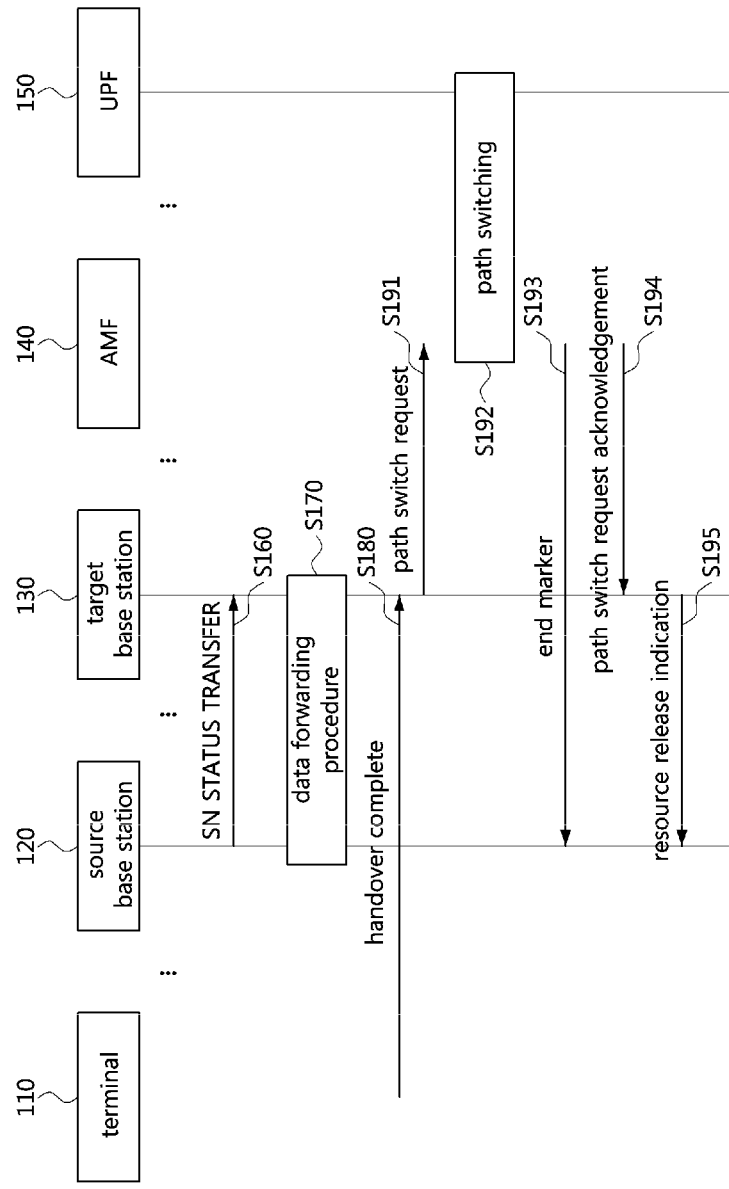

FIGS. 1A and 1B are sequence charts for describing a conventional handover procedure in a mobile communication system.

Referring to FIGS. 1A and 1B, an intra-AMF/UPF handover procedure defined in the new radio (NR) technical specification (TS) 38.300 of the 3rd generation partnership project (3GPP) is shown.

In FIGS. 1A and 1B, a terminal 110 may be connected to a source base station 120 that is a current serving cell, and may transmit and receive data for the terminal 110 with a user plane function (UPF) 150 of a core network. A procedure to be described later is for describing a procedure for the terminal 110 to handover from the source base station 120 to a target base station 130.

The source base station 120 may obtain mobility control information for the terminal 110 (S110). In the step S110, the source base station 120 may obtain information related to roaming, access restriction, etc. of the terminal, which is collected through a tracking area update procedure, in a radio resource control (RRC) connection configuration procedure with the terminal 110 and an information exchange procedure with an access and mobility management function (AMF) of the core network, and may use the information for mobility control.

The source base station 120 may transmit control information for measurement and measurement reporting of the terminal 110 to the terminal 110, and the terminal 110 may perform measurement and measurement reporting operations based on the received control information, and transmit a measurement result report to the source base station 120 (S120).

The source base station 120 may decide a handover of the terminal 110 based on the measurement result report and radio resource management (RRM) information received from the terminal 110 (S130).

When the handover of the terminal 110 is determined in the step S130, the source base station 120 may transmit a handover request message to the target base station 130 to instruct the target base station 130 to prepare for the handover (S141). The handover request message may include information necessary for the target base station 130 to prepare for the handover. Upon receiving the handover request message, the target base station 130 may perform admission control to determine whether to accept the handover of the terminal 110 (S142). When it is determined to accept the handover of the terminal 110, the target base station 130 may prepare the handover of the terminal, and transmit a handover request acknowledgement message that is an acknowledgement message for the handover request message (S143). In this case, the handover request acknowledgement message may include information that the source base station 120 is to transmit to the terminal 110 in a step S150 to be described later. For example, the handover request acknowledgement message may include information on a random access resource to be used in an access procedure for the terminal to access the target base station.

Upon receiving the handover request acknowledgement message, the source base station 120 may transmit a handover command message to the terminal 110 (S150). In this case, the handover command message may be transmitted as a radio resource control (RRC) connection reconfiguration message. Also, the handover command message may include the information on the random access resource included in the handover request acknowledgement message received from the target base station 130.

Upon receiving the handover command message, the terminal may execute the handover immediately. Therefore, the terminal 110 may disconnect from the source base station 120 and attempt to access the target base station 120. The terminal may attempt random access (RA) (i.e., transmit a random access channel (RACH)) to the target base station using the information on the random access resource included in the handover command message, and the target base station may transmit a random access response (RAR) in response to the RACH. The random access procedure is not shown in FIGS. 1A and 1B, and detailed description thereof is omitted.

Meanwhile, the source base station 120 may transmit a sequence number (SN) status transfer message to the target base station 130 in order to transfer packet data convergence protocol (PDCP) protocol data unit (PDU) transmission and reception status information with respect to the terminal 110 (S160).

Meanwhile, a data forwarding procedure between the source base station 120 and the target base station 130 may be performed (S170). In the step S170, the source base station 120 may configure a data forwarding tunnel with the target base station 130. The source base station 120 may transfer data to be transmitted to the terminal, which is received from the UPF 150, to the target base station 140 through the configured forwarding tunnel. In addition, the source base station 120 may transfer uplink data received from the terminal 110 to the target base station 130 through the configured forwarding tunnel. In this case, the data forwarding tunnel may be configured on an X2 or Xn interface, which is a logical interface between the two base stations.

When the terminal 110 accesses the target base station 130 through the random access procedure described above, the terminal may transmit an RRC connection reconfiguration complete message to the target base station 130, thereby reporting that the handover procedure of the terminal has completed (S180).

When the handover procedure of the terminal is completed, the target base station 130 may transmit a path switch request message to the AMF 140 (S191), and the AMF 140 may control the UPF 150 to switch a destination of a path of downlink data transmitted to the terminal 110 from the source base station 120 to the target base station 130 (S192).

The UPF 150 may switch the path of the downlink data to the terminal to the target base station 130, and the AMF 140 may transmit an end marker to the terminal 110, the end marker informing that the data transmission for the terminal through the path to the source base station 120 has been terminated (S193). Subsequently, all downlink data for the terminal and uplink data of the terminal may be transmitted through the path between the target base station 130 and the UPF 150.

The AMF 140 may transmit a path switch request acknowledgment message to the target base station 130 (S194), and the target base station 130 may inform the source base station 120 that the entire handover procedure for the terminal 110 has been successfully completed by transmitting a resource release indication message (e.g., UE context release) for instructing to release UE context information (S195).

On the other hand, an ideal backhaul and a non-ideal backhaul defined in the 3GPP technical requirement (TR) 36.932 may be used as a backhaul for the inter-base station interface (e.g., X2 or Xn interface). Since the ideal backhaul has a negligible transmission delay and a high transmission rate, it does not affect the implementation of wireless transmission technology such as carrier aggregation between the terminal and the base station. However, since the non-ideal backhaul has a large transmission delay that cannot be ignored and a relatively low transmission rate, it may affect the implementation of wireless transmission technology between the terminal and the base station. For example, Tables 1 and 2 are tables listing categories of the non-ideal backhaul and the ideal backhaul.

TABLE 1

| Backhaul technology | Latency (one-way) | Throughput | Priority (Highest: 1) |
| --- | --- | --- | --- |
| Fiber Access 1 | 10-30 ms | 10 M-10 Gbps | 1 |
| Fiber Access 2 | 5-10 ms | 100-1000 Mbps | 2 |
| Fiber Access 3 | 2-5 ms | 50 M-10 Gbps | 1 |
| DSL Access | 15-60 ms | 10-100 Mbps | 1 |
| Cable | 25-35 ms | 10-100 Mbps | 2 |
| Wireless Backhaul | 5-35 ms | 10 Mbps-100 Mbps, typically (support up to Gbps level) | 1 |

TABLE 2

| Backhaul technology | Latency (one-way) | Throughput | Priority (Highest: 1) |
| --- | --- | --- | --- |
| Fiber Access 4 | Less than 2.5 us | Support up to 10 Gbps | 1 |

Accordingly, when a non-ideal backhaul is used as the backhaul for the inter-base station interface (X2 or Xn interface), all data transferred in the data forwarding procedure between the source base station 120 and the target base station 130 may be transmitted to the terminal with a delay time corresponding to the backhaul transmission delay, the low-latency requirements of the URLLC service may not be satisfied.

As one of core network enhancement technologies for the URLLC service, the 3GPP TR 23.725 proposes an 'enhanced handover with Xn' solution to reduce such the data transmission delay when using the inter-base station interface.

Figure 2A:
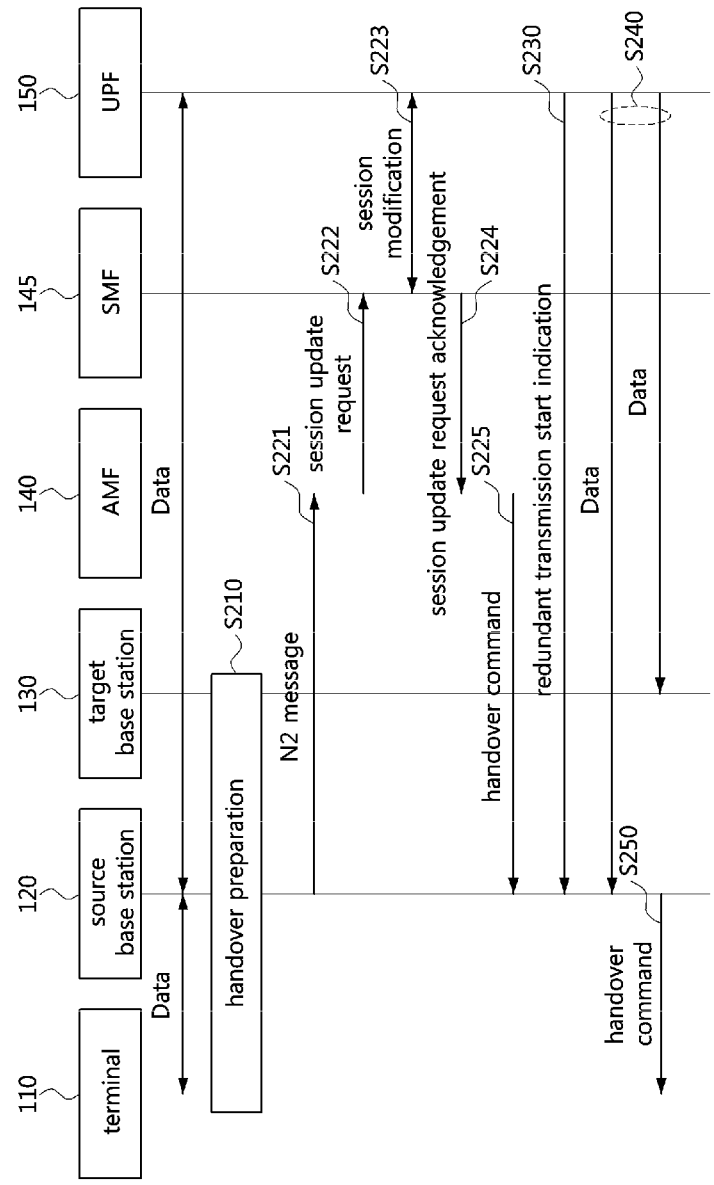
FIGS. 2A and 2B are sequence charts for describing an improved handover procedure proposed in the 3GPP NR.
Figure 2B:
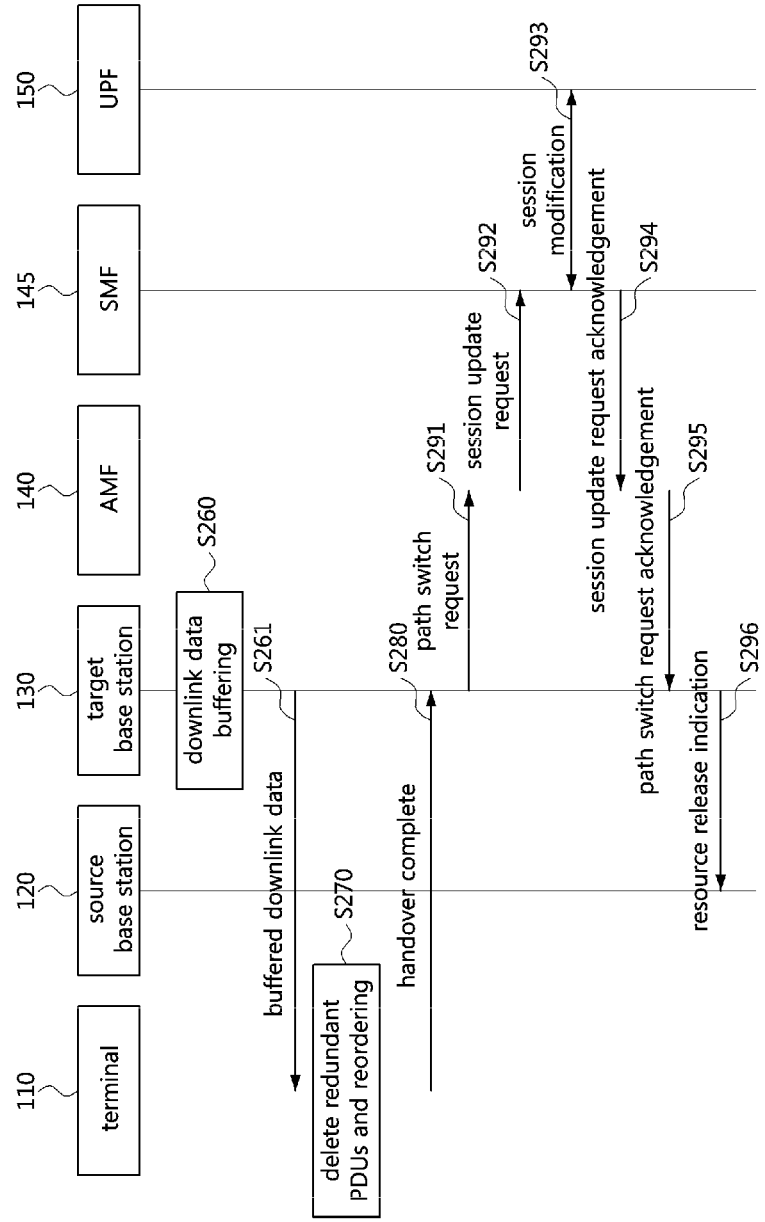

FIGS. 2A and 2B are sequence charts for describing an improved handover procedure proposed in the 3GPP NR.

Referring to FIGS. 2A and 2B, a handover procedure according to the 'enhanced handover with Xn' solution defined in the 3PP TR 23. 725 is shown.

Referring to FIGS. 2A and 2B, the terminal 110 may be connected to the source base station 120 which is a current serving cell, and may transmit and receive data for the terminal with the UPF 150 of the core network. A procedure to be described later is for describing a procedure for the terminal 110 to handover from the source base station 120 to the target base station 130. On the other hand, for clarity of description, in FIGS. 2A and 2B, illustration and description of the same or similar steps as those of the procedure described in FIGS. 1A and 1B may be omitted.

In the proposed handover procedure, in order to reduce a delay time of data transmitted from the source base station to the target base station in the handover procedure based on the inter-base station interface (Xn interface), the UPF 150 may transmit the same data redundantly by using both of a data tunnel configured with the source base station 120 and a data tunnel configured with the target base station 130. That is, it is possible to seamlessly transmit data to the terminal without data forwarding between the base stations.

The handover preparation between the terminal 110 and the base stations 120 and 130 may be performed (S210). The handover preparation in the step S210 may mean all or part of the steps S110 to S143 of FIG. 1A described above.

The source base station 120 may transmit an N2 message to the AMF 140 (S221). The N2 message may include an ID of a PDU session for the terminal 110, which is to be path-switched. The AMF 140 may transmit a session update request message to a session management function (SMF) 145 of the core network based on the received N2 message (S222). In this case, the session update request message may include the ID of the PDU session for the terminal received through the N2 message. The SMF 145 may request to the UPF 150 a session modification for configuring a second tunnel with the target base station 130 for the PDU session indicated by the corresponding PDU session ID based on the received session update request message (S223). Hereinafter, the tunnel configured between the target base station 130 and the UPF 150 during the handover procedure may be referred to also as a 'secondary tunnel'. Meanwhile, the tunnel that has already been configured between the UPF 150 and the source base station 120, which is a serving cell before performing the handover procedure, may be referred to as an 'original tunnel'. When the secondary tunnel is configured, the SMF 145 may transmit a session update request acknowledgment message to the AMF 140 (S224). Meanwhile, the original tunnel and the secondary tunnel may be general packet radio service (GPRS) tunneling protocol (GTP) tunnels.

Upon receiving the session update request acknowledgement message, the AMF 140 may transmit a handover command message to the source base station 120 (S225). Meanwhile, the handover command message in this step should be distinguished from the handover command message transmitted from the source base station 120 to the terminal 110 in the step S150 of FIG. 1A. That is, the handover command message in the step S150 of FIG. 1A means a command for the terminal to reconfigure the RRC connection of the terminal, and the handover command message of the step S225 of FIG. 2A may be a message for the AMF 140 to inform the source base station 120 that redundant transmission of the data has been configured.

The UPF 150 may transmit an indication message informing that the redundant transmission of the data has started to the source base station 110 (S230), and may redundantly transmit the same data using the tunnels configured to the source and target base stations (S240).

The source base station 120 may transmit a handover command message to the terminal 110 (S250). Here, the handover command message may correspond to the handover command message transmitted from the source base station to the terminal in the step S150 of FIG. 1A. That is, the handover command message in this step may be an RRC connection reconfiguration message.

On the other hand, the target base station 130 may buffer data received from the UPF 150 (i.e., data to be transmitted to the terminal 110) until the terminal 110 accesses the target base station 130 through the handover (S260). When the terminal 110 is connected to the target base station 130 through the handover, the target base station may transmit the buffered downlink data to the terminal 110 (S261).

The terminal 110 may discard the duplicated-received PDUs based on sequence number (SN) information of the PDCP PDUs received from the source base station 120 and the target base station 130, and reorder the remaining PDUs according to the order of SNs (S270). Meanwhile, the UPF 150 may discard the duplicated-received PDUs based on GTP-U SN information of the uplink data of the terminal received through the tunnels configured for the source base station 120 and the target base station 130, and reorder the remaining PDUs according to the order of SNs.

The terminal 110 may report that the handover procedure of the terminal has been completed by transmitting an RRC connection reconfiguration complete message to the target base station 130 (S280).

When the handover procedure of the terminal 110 is completed, the target base station 130 may transmit a path switch request message to the AMF 140 (S291), and the AMF 140 may transmit to the SMF 145 a session update request message for controlling the UPF 150 to release the tunnel to the source base station (i.e., the original tunnel) (S292). The SMF 145 may release the original tunnel by requesting a session modification to the UPF 150 based on the received session update request message (S293), and transmit a session update request acknowledgement message indicating that the original tunnel has been released to the AMF 140 (S294).

The AMF 140 may transmit a path switch request acknowledgment message to the target base station 130 (S295), and the target base station 130 may inform the source base station 120 that the entire handover procedure for the terminal 110 has been successfully completed by transmitting to the source base station 120 a resource release indication message (e.g., UE context release) instructing to release the context information of the terminal (i.e., UE context information) (S296).

On the other hand, the handover procedure based on the above-mentioned 'enhanced handover with Xn' solution has problems of deteriorating performance.

First, since the redundant transmission to the target base station is started much earlier than when the terminal executes the handover, a lot of redundant data may be generated. That is, there may be a problem in that data redundantly received from the source base station and the target base station should be deleted after the handover is performed. In addition, in order to reduce this problem, the redundant transmission to the target base station may be started when receiving reception status information after the completion of the handover, but a data transmission delay problem may occur.

Second, since data is redundantly transmitted to the target base station regardless of PDCP PDU reception state of the terminal, a lot of redundant data may be generated. That is, there may also be a problem in that data redundantly received from the source base station and the target base station should be deleted after the handover is performed. In addition, in order to reduce this problem, the redundant transmission to the target base station may be started when receiving reception status information after the completion of the handover, but a data transmission delay problem may occur.

In order to solve the above-described problem, an exemplary embodiment of the present disclosure proposes a handover method capable of improving the efficiency of resource use while solving the latency problem by controlling the redundant transmission of the UPF based on PDU reception status information of the terminal.

Figure 3A:
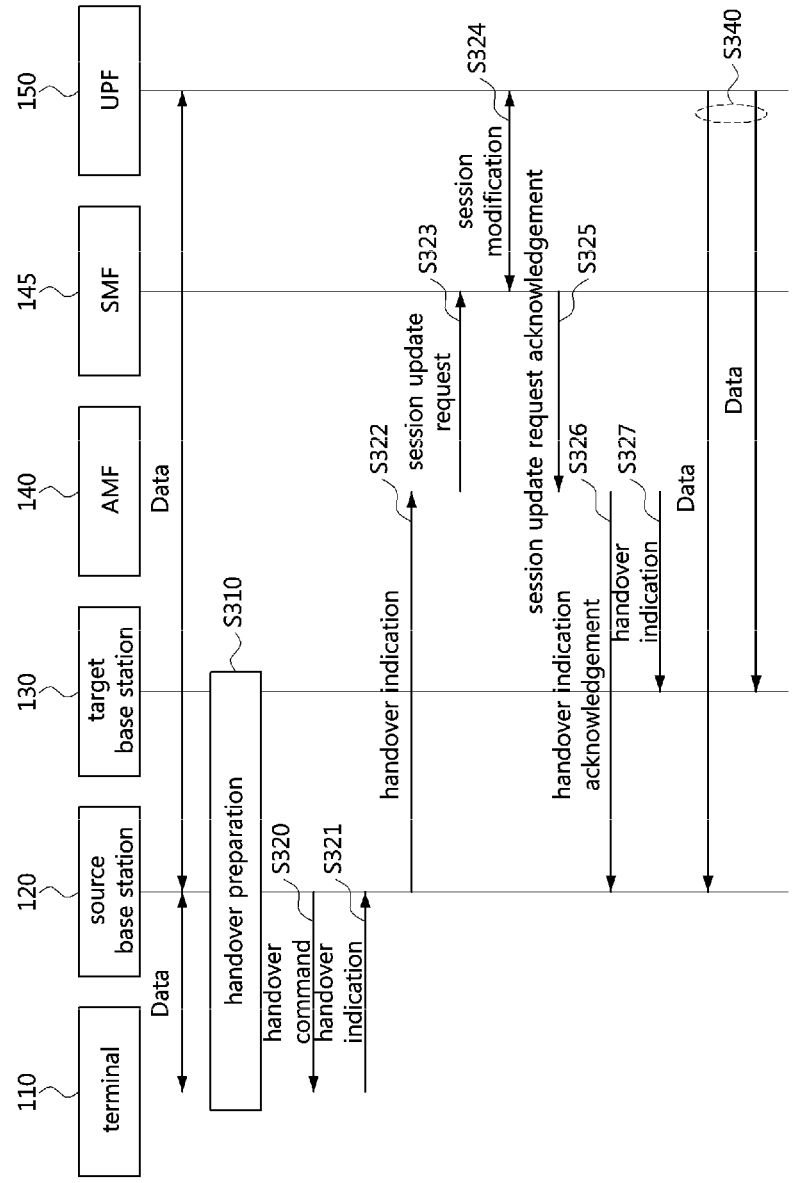

FIGS. 3A and 3B are sequence charts for describing a handover method according to an exemplary embodiment of the present disclosure.

In FIGS. 3A and 3B, the terminal 110 may be connected to the current serving cell, the source base station 120, to transmit and receive user data with the user plane function (UPF) 150 of the core network. A procedure to be described later is for describing a handover procedure of the terminal 110 from the source base station 120 to the target base station 130 that is a target cell.

The handover preparation between the terminal 110 and the base stations 120 and 130 may be performed (S310). The handover preparation in the step S310 may mean all or part of the steps S110 to S143 of FIG. 1A described above.

First, the source base station 120 may transmit a handover command message to the terminal 110 (S320). Here, the handover command message may correspond to the handover command message transmitted from the source base station to the terminal in the step S150 of FIG. 1A. That is, the handover command message may be an RRC connection reconfiguration message.

The terminal 110 may determine a handover execution time, and transmit a handover indication message including information on the target base station 130 determined as a target of the handover and PDCP downlink reception status information to the source base station 120 (S321). Here, the PDCP downlink reception status information may include the same information as information included in a 'PDCP status report control PDU'. The PDCP downlink reception status information may include information on SNs of PDCP PDUs received by the terminal 110 from the source base station 120 (or information on the first missing PDU SN) or include a bitmap indicating PDUs requiring to be retransmitted.

Compared to the handover procedure according to the 'enhanced handover with Xn' solution described in FIGS. 2A and 2B, there is a difference in that the handover indication message including the PDCP downlink reception status information of the terminal 110 is transmitted from the terminal 110 to the source base station 120 before the source base station 120 transmits the N2 message to the AMF 140.

Meanwhile, the handover indication message from the terminal 110 may include a predetermined field that is flag information for controlling whether the UPF 150 performs redundant transmission. Hereinafter, the flag information may be referred to as 'upf_bicasting_handover'.

When the upf_bicasting_handover is set in the handover indication message, in order to inform the UPF 150 of information necessary for data forwarding to the target base station, the source base station 120 receiving the handover indication message from the terminal 110 may transmit to the AMF 140 a handover indication message including at least one among the PDCP downlink reception status information received from the terminal, PDCP uplink reception status information of the source base station 120, information on the target base station 130, and mapping information between GTP SNs between the UPF 150 and the source base station 120 and PDCP SNs between the source base station 120 and the terminal 110. That is, the handover indication message transmitted from the source base station 120 to the AMF 140 may further include information for controlling the tunnel configuration of the UPF compared to the N2 message described in the step S221 of FIG. 2A. Meanwhile, the PDCP uplink reception status information may include information on SNs (or information on the first missing PDU) of PDCP PDUs received by the source base station 120 from the terminal 110 or a bitmap indicating PDUs requiring to be retransmitted.

The AMF 140 may transmit a session update request message to the SMF 145 of the core network based on the received handover indication message (S323). In this case, the session update request message may be generated based on the information received through the handover indication message. The SMF 145 may request the UPF 150 a session modification that configures a secondary tunnel with the target base station 130 based on the received session update request message (S324). As described in FIGS. 2A and 2B, the tunnel generated between the target base station 130 and the UPF 150 during the handover procedure may be referred to as a 'secondary tunnel'. Meanwhile, a tunnel that has already been configured between the UPF 150 and the serving base station 120 which is a serving cell before performing the handover procedure, may be referred to as an 'original tunnel'. When the secondary tunnel is configured, the SMF 145 may transmit a session update request acknowledgment message to the AMF 140 (S325). Meanwhile, the original tunnel and the secondary tunnel may be GTP tunnels.

In FIGS. 3A and 3B, a procedure, in which the source base station 120 transfers such the information (e.g., PDCP downlink reception status information, PDCP uplink reception status information, information on the target base station 130, mapping information between GTP SNs and PDCP SNs) to the SMF 1450 by transmitting the handover indication message to the AMF 140, and the SMF 140 transfers the information to the UPF 150, is shown. However, the source base station 120 may directly transfer the information to the UPF 150. Alternatively, the source base station 120 may transfer the information to the SMF 145, and the SMF 145 may transfer the information to the UPF 150. That is, information transfer between the source base station 120 and the UPF 150 may be variously configured according to the existence of the AMF 140 and/or the SMF 145 or the economics of the procedure.

Meanwhile, in FIGS. 3A and 3B, it is described that the terminal 110 transmits the handover indication message to the source base station 120 (S321). However, when it is possible that the source base station 120 determines that the terminal 110 has started to perform the handover without receiving the handover indication message, the source base station 120 may generate the handover indication message including the information (e.g., PDCP downlink reception status information, PDCP uplink reception status information, information on the target base station 130, mapping information between GTP SNs and PDCP SNs) based on information already known by the source base station 120, and transmit the handover indication message to the AMF 140.

Meanwhile, the session update request acknowledgement message transmitted by the UPF 150 to the AMF 140 may include the above information (e.g., PDCP downlink reception status information, PDCP uplink reception status information, information on the target base station 130, mapping information between GTP SNs and PDCP SNs). The AMF 140 may transmit the above information to the source base station 120 as a handover indication acknowledgment message (S326). In addition, the AMF 140 may transmit a handover indication message including the above information to the target base station 130 (S327). Here, the handover indication acknowledgment message transmitted by the AMF 140 to the source base station 120 may be omitted.

Thereafter, the UPF 150 may transmit downlink data to be transmitted to the terminal 110 to the target base station 130 or may redundantly transmit the downlink data to the source base station 120 and the target base station 130 as necessary (S340).

On the other hand, the target base station 130 may buffer data received from the UPF 150 (i.e., data to be transmitted to the terminal 110) until the terminal 110 accesses the target base station 130 through the handover. When the terminal 110 is connected to the target base station 130 through the handover, the target base station may transmit the buffered downlink data to the terminal 110 (S361).

The terminal 110 may discard the duplicated-received PDUs based on SN information of the PDCP PDUs received from the source base station 120 and the target base station 130, and reorder the remaining PDUs according to the order of SNs. Meanwhile, the UPF 150 may discard the duplicated-received PDUs based on GTP-U SN information of the uplink data of the terminal received through the tunnels configured for the source base station 120 and the target base station 130, and reorder the remaining PDUs according to the order of SNs.

The terminal 110 may report that the handover procedure of the terminal has been completed by transmitting an RRC connection reconfiguration complete message to the target base station 130 (S380).

When the handover procedure of the terminal 110 is completed, the target base station 130 may transmit a path switch request message to the AMF 140 (S391), and the AMF 140 may transmit to the SMF 145 a session update request message for controlling the UPF 150 to release the tunnel to the source base station (i.e., the original tunnel) (S392). The SMF 145 may release the original tunnel by requesting a session modification to the UPF 150 based on the received session update request message (S393), and transmit a session update request acknowledgement message indicating that the original tunnel has been released to the AMF 140 (S394).

The AMF 140 may transmit a path switch request acknowledgment message to the target base station 130 (S395), and the target base station 130 may inform the source base station 120 that the entire handover procedure for the terminal 110 has been successfully completed by transmitting to the source base station 120 a resource release indication message (e.g., UE context release) instructing to release the context information of the terminal (i.e., UE context information) (S396).

Meanwhile, when the steps S391 to S396 can be performed through the steps S322 to S326, all or part of the steps S391 to S396 may be omitted. Alternatively, when the steps S391 to S395 can be performed through the steps S322 to S325, the steps S391 to S395 may be omitted. Alternatively, when the step S396 can be performed through the step S326, the step S396 may be omitted.

Hereinafter, a method for mapping GTP SNs and PDCP SNs in the handover method according to the exemplary embodiment of the present disclosure described through FIGS. 3A and 3B will be described. That is, a method for mapping GTP SNs and PDCP SNs by using mapping information between SNs of packets exchanged by the UPF 150 and the source base station 120 and/or the target base station 130 through the GTP tunnels and SNs of PDUs exchanged by the terminal 150 and the source base station 120 and/or the target base station 130 will be described.

Figures 4, 5:
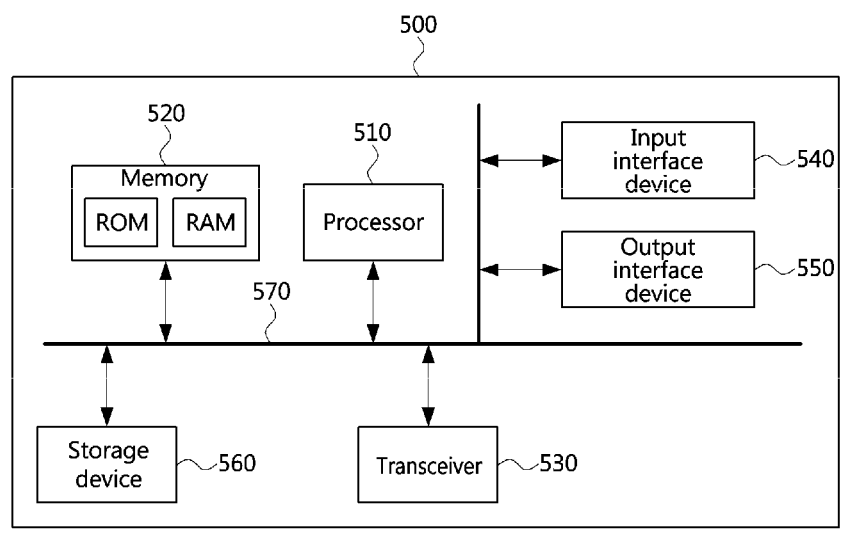
FIG. 4 is a conceptual diagram illustrating a header format of a GTP-U packet defined in the 3GPP TS 29.281.
FIG. 5 is a block diagram illustrating a communication node according to exemplary embodiments of the present disclosure.

FIG. 4 is a conceptual diagram illustrating a header format of a GTP-U packet defined in the 3GPP TS 29.281.

The source base station 120 may request the UPF 150 to include an SN in a GTP-U header when the redundant transmission is required for the target base station 130 and the source base station 120 (i.e., when upf_bicasting_handover is set). This request may be delivered to the UPF 150 through the AMF 140. The source base station 120 may maintain mapping information between the GTP SNs received from the UPF 150 and the PDCP SNs transmitted to the terminal 110 with respect to downlink data. In addition, the source base station 120 may maintain mapping information between the PDCP SNs received from the terminal 110 and the GTP SNs transmitted to the UPF 150 with respect to uplink data.

Upon receiving the mapping information between the GTP SNs between the UPF 150 and the source base station 120 and the PDCP SNs between the source base station 120 and the terminal 110, the UPF 150 may inform the target base station 130 of the corresponding information so that the source base station 120, the target base station 130, and the UPF 150 can synchronize GTP/PDCP SN mapping information. For example, when the source base station 120 receiving a GTP SN 100 for downlink data allocates and transmits a PDCP SN 200 for the corresponding data, the target base station 130 receiving a GTP SN 110 may allocate and transmit a PDCP SN 210 for the corresponding data. When the source base station 120 receiving a PDCP SN 300 for uplink data allocates and transmits a GTP SN 400 for the corresponding data, the target base station 130 receiving a PDCP SN 310 may allocate and transmit a GTP SN 410 for the corresponding data. The length (number of bits) of the GTP SN and the length (number of bits) of the PDCP SN are different, but the SN ambiguity problem does not occur because the GTP/PDCP SN mapping information is synchronized within a short time.

The terminal 110 may reorder the data received from the source base station 120 and the data received from the target base station 130 based on the PDCP SNs. Through this, the PDCP layer of the terminal 110 may transmit the reordered downlink data to the upper layer. To this end, the UPF 150 may transmit all missing data from the first missing PDCP SDU or PDU to the target base station 130 or transmit selectively downlink data requiring to be retransmitted according to the PDCP downlink reception status information received from the source base station 120. In this case, a GTP SN may be allocated and transmitted so that the target base station 130 allocates and transmits a correct PDCP SN according to the GTP/PDCP SN mapping information.

The UPF 150 may reorder the data received from the source base station 120 and the data received from the target base station 130 based on the GTP SNs. Through this way, the UPF 150 may transmit the reordered uplink data to the upper layer. To this end, the terminal 110 may transmit all missing data from the first missing PDCP SDU or PDU to the target base station 130 or transmit selectively downlink data requiring to be retransmitted according to the PDCP uplink reception status information received. In this case, the target base station 130 may allocate a correct GTP SN for a received PDCP SDU according to the GTP/PDCP SN mapping information, transmit the received PDCP SDU to the UPF, and the UPF may perform the reordering based on the GTP SNs.

FIG. 5 is a block diagram illustrating a communication node according to exemplary embodiments of the present disclosure.

The communication node exemplified in FIG. 5 may be a terminal or a base station, as an apparatus performing the methods according to the exemplary embodiments of the present disclosure.

Referring to FIG. 5, a communication node 500 may include at least one processor 510, a memory 520, and a transceiver 530 connected to a network to perform communication. In addition, the communication node 500 may further include an input interface device 540, an output interface device 550, a storage device 560, and the like. The components included in the communication node 500 may be connected by a bus 570 to communicate with each other.

However, each component included in the communication node 500 may be connected to the processor 510 through a separate interface or a separate bus instead of the common bus 570. For example, the processor 510 may be connected to at least one of the memory 520, the transceiver 530, the input interface device 540, the output interface device 550, and the storage device 560 through a dedicated interface.

The processor 510 may execute at least one instruction stored in at least one of the memory 520 and the storage device 560. The processor 510 may refer to a central processing unit (CPU), a graphics processing unit (GPU), or a dedicated processor on which the methods according to the exemplary embodiments of the present invention are performed. Each of the memory 520 and the storage device 560 may be configured as at least one of a volatile storage medium and a nonvolatile storage medium. For example, the memory 520 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal performing handover in a mobile communication system, the operation method comprising:
transmitting packet data convergence protocol (PDCP) downlink reception status information of the terminal and information on a target base station to a source base station;
receiving downlink data from a user plane function (UPF) via the source base station based on a first tunnel configured between the source base station and the UPF;
receiving downlink data from the UPF via the target base station based on a second tunnel configured by the UPF between the target base station and the UPF by using the PDCP downlink reception status information and the information on the target base station, which are transferred from the source base station; and
discarding duplicated-received protocol data units (PDUs) from the source base station and the target base station, and reordering remaining PDUs;
wherein PDCP uplink reception status information of the source base station is transferred by the source base station to the UPF, and the PDCP uplink reception status information is information indicating SN information of uplink PDCP PDUs received by the source base station from the terminal or information indicating uplink PDCP PDUs requiring to be retransmitted.

2. The operation method according to claim 1, wherein the PDCP downlink reception status information is sequence number (SN) information of downlink PDCP PDUs received by the terminal from the source base station or information indicating downlink PDCP PDUs requiring to be retransmitted.

3. The operation method according to claim 1, wherein each of the first tunnel and the second tunnel is a GPRS tunneling protocol (GTP) tunnel.

4. The operation method according to claim 3, wherein mapping information between PDCP SN information among the terminal, the source base station, and the target base station, and GTP SN information among the source base station, the target base station, and the UPF is managed by the source base station, and the source base station and the target base station perform mapping between SNs of GTP packets exchanged with the UPF and SNs of PDCP PDUs exchanged with the terminal by using the mapping information.

5. The operation method according to claim 1, further comprising transmitting a handover complete message to the target base station, wherein the UPF releases the first tunnel according to a path switch request of the target base station.

6. An operation method of a source base station supporting handover of a terminal in a mobile communication system, the operation method comprising:
receiving packet data convergence protocol (PDCP) downlink reception status information of the terminal and information on a target base station from the terminal;
transmitting the PDCP downlink reception status information and the information on the target base station to a user plane function (UPF);
receiving downlink data from the UPF based on a first tunnel configured between the source base station and the UPF; and
transmitting the received downlink data to the terminal,
wherein the target base station receives downlink data from the UPF based on a second tunnel configured by the UPF between the target base station and the UPF by using the PDCP downlink reception status information and the information on the target base station, stores the downlink data in a buffer, and transmit the downlink data stored in the buffer to the terminal, and the terminal discards duplicated-received protocol data units (PDUs) from the source base station and the target base station, and reorders remaining PDUs.

7. The operation method according to claim 6, further comprising transferring the PDCP downlink reception status information and the information on the target base station to an access and mobility management function (AMF), wherein the AMF transfers the PDCP downlink reception status information and the information on the target base station to the UPF via a session management function (SMF).

8. The operation method according to claim 6, further comprising transferring the PDCP downlink reception status information and the information on the target base station to a session management function (SMF), wherein the SMF transfers the PDCP downlink reception status information and the information on the target base station to the UPF.

9. The operation method according to claim 6, further comprising directly transferring the PDCP downlink reception status information and the information on the target base station to the UPF.

10. The operation method according to claim 6, wherein the PDCP downlink reception status information is sequence number (SN) information of downlink PDCP PDUs received by the terminal from the source base station or information indicating downlink PDCP PDUs requiring to be retransmitted.

11. The operation method according to claim 6, further comprising transferring PDCP uplink reception status information of the source base station to the UPF, wherein the PDCP uplink reception status information is information indicating SN information of uplink PDCP PDUs received by the source base station from the terminal or information indicating uplink PDCP PDUs requiring to be retransmitted.

12. The operation method according to claim 6, wherein each of the first tunnel and the second tunnel is a GPRS tunneling protocol (GTP) tunnel.

13. The operation method according to claim 12, wherein mapping information between PDCP SN information among the terminal, the source base station, and the target base station, and GTP SN information among the source base station, the target base station, and the UPF is managed by the source base station, and the source base station performs mapping between SNs of GTP packets exchanged with the UPF and SNs of PDCP PDUs exchanged with the terminal by using the mapping information.

14. An operation method of a target base station supporting handover of a terminal in a mobile communication system, the operation method comprising:
configuring a second tunnel with a user plane function (UPF) based on packet data convergence protocol (PDCP) downlink reception status information of the terminal and information on the target base station, which are transferred from a source base station to the UPF;
receiving downlink data from the UPF based on the second tunnel, and storing the downlink data in a buffer;
transmitting the downlink data stored in the buffer to the terminal; and
transmitting a path switch request to an access and mobility management function (AMF) when receiving a handover complete message from the terminal, and instructing the source base station to release resources for the terminal when an acknowledgement message for the path switch request is received from the AMF,
wherein the source base station receives downlink data from the UPF based on a first tunnel configured between the UPF and the source base station and transmits the downlink data to the terminal, and the terminal discards duplicated-received protocol data units (PDUs) from the source base station and the target base station, and reorders remaining PDUs.

15. The operation method according to claim 14, wherein the PDCP downlink reception status information and the information on the target base station are transferred from the source base station to the UPF via the AMF and a session management function (SMF).

16. The operation method according to claim 14, wherein the PDCP downlink reception status information and the information on the target base station are transferred from the source base station to the UPF via a session management function (SMF).

17. The operation method according to claim 14, wherein the PDCP downlink reception status information is sequence number (SN) information of downlink PDCP PDUs received by the terminal from the source base station or information indicating downlink PDCP PDUs requiring to be retransmitted.

18. The operation method according to claim 14, wherein each of the first tunnel and the second tunnel is a GPRS tunneling protocol (GTP) tunnel.

19. The operation method according to claim 14, wherein mapping information between PDCP SN information among the terminal, the source base station, and the target base station, and GTP SN information among the source base station, the target base station, and the UPF is managed by the target base station, and the target base station performs mapping between SNs of GTP packets exchanged with the UPF and SNs of PDCP PDUs exchanged with the terminal by using the mapping information.

* * * * *